United States Patent
Campbell

(10) Patent No.: US 10,676,188 B2
(45) Date of Patent: Jun. 9, 2020

(54) TILTROTOR AIRCRAFT HAVING A DOWNWARDLY TILTABLE AFT ROTOR

(71) Applicant: Textron Innovations Inc., Providence, RI (US)

(72) Inventor: Kip Gregory Campbell, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 303 days.

(21) Appl. No.: 15/724,649

(22) Filed: Oct. 4, 2017

(65) Prior Publication Data
US 2019/0100303 A1  Apr. 4, 2019

(51) Int. Cl.
| | |
|---|---|
| *B64C 29/00* | (2006.01) |
| *B64C 27/26* | (2006.01) |
| *B64C 27/28* | (2006.01) |
| *B64C 27/52* | (2006.01) |
| *B64C 15/12* | (2006.01) |

(52) U.S. Cl.
CPC .......... *B64C 29/0033* (2013.01); *B64C 27/26* (2013.01); *B64C 27/28* (2013.01); *B64C 15/12* (2013.01); *B64C 27/52* (2013.01)

(58) Field of Classification Search
CPC ...... B64C 29/0033; B64C 27/52; B64C 27/82
See application file for complete search history.

(56) References Cited

U.S. PATENT DOCUMENTS

| | | | | |
|---|---|---|---|---|
| 2,478,847 A | * | 8/1949 | Stuart ................. | B64C 29/0033 244/7 R |
| 2,738,146 A | * | 3/1956 | Medvedeff .......... | B64C 29/0033 244/6 |

(Continued)

FOREIGN PATENT DOCUMENTS

| | | |
|---|---|---|
| AU | 532184 B2 | 9/1983 |
| CN | 103587683 A | 2/2014 |

(Continued)

OTHER PUBLICATIONS

European Examination Report; Application No. 18195580.8; European Patent Office; dated Jan. 24, 2019.

(Continued)

*Primary Examiner* — Philip J Bonzell
*Assistant Examiner* — Tye William Abell
(74) *Attorney, Agent, or Firm* — Lawrence Youst PLLC

(57) ABSTRACT

A tiltrotor aircraft has a vertical takeoff and landing flight mode and a forward flight mode. The tiltrotor aircraft includes a longitudinally extending fuselage with a wing extending laterally therefrom having oppositely disposed wing tips distal from the fuselage. Tip booms respectively extend longitudinally from the wing tips. Forward rotors are coupled to the forward ends of the tip booms. The forward rotors are reversibly tiltable between a vertical lift orientation, wherein the forward rotors are above the tip booms, and a forward thrust orientation, wherein the forward rotors are forward of the tip booms. An aft rotor is coupled to the aft end of the fuselage. The aft rotor is reversibly tiltable between a vertical lift orientation, wherein the aft rotor is below the fuselage, and a forward thrust orientation, wherein the aft rotor is aft of the fuselage.

20 Claims, 9 Drawing Sheets

(56) References Cited

U.S. PATENT DOCUMENTS

| | | | | |
|---|---|---|---|---|
| 2,814,451 | A * | 11/1957 | Turner | B64C 29/0033 244/7 R |
| 3,081,964 | A | 3/1963 | Quenzler | |
| 3,185,408 | A * | 5/1965 | Higgins | B64C 29/0033 244/7 R |
| 5,941,478 | A * | 8/1999 | Schmittle | B64C 1/00 244/120 |
| 6,655,631 | B2 | 12/2003 | Austen-Brown | |
| 9,643,720 | B2 | 5/2017 | Hesselbarth | |
| 2011/0001020 | A1 | 1/2011 | Forgac | |
| 2013/0147204 | A1 * | 6/2013 | Botti | B64D 27/24 290/1 A |
| 2014/0061368 | A1 * | 3/2014 | Karim | B64C 29/0033 244/12.4 |
| 2014/0339372 | A1 * | 11/2014 | Dekel | B64C 29/0033 244/7 R |
| 2015/0136897 | A1 | 5/2015 | Seibel et al. | |
| 2015/0151844 | A1 * | 6/2015 | Anton | B64C 31/024 244/55 |
| 2016/0229531 | A1 * | 8/2016 | Robertson | B64C 29/0033 |
| 2017/0217584 | A1 * | 8/2017 | Elfeky | B64C 29/0033 |
| 2017/0240274 | A1 * | 8/2017 | Regev | B64C 29/0033 |
| 2018/0208305 | A1 * | 7/2018 | Lloyd | B60L 50/90 |
| 2018/0215465 | A1 * | 8/2018 | Renteria | B64C 29/0033 |
| 2018/0297695 | A1 * | 10/2018 | Ramirez-Serrano | B64C 27/52 |
| 2018/0370625 | A1 * | 12/2018 | Netzer | B64C 29/0033 |
| 2019/0061936 | A1 * | 2/2019 | North | B64C 29/0075 |

FOREIGN PATENT DOCUMENTS

| | | |
|---|---|---|
| DE | 102014000509 A1 | 7/2015 |
| WO | 2013178776 A1 | 12/2013 |
| WO | 2014058351 A2 | 4/2014 |
| WO | 2018203036 A1 | 11/2018 |
| WO | 2019034765 A1 | 2/2019 |

OTHER PUBLICATIONS

European Search Report; EPO; Application No. 18195579.0; dated Jan. 8, 2019.
European Examination Report; Application No. 18195579.0; European Patent Office; dated Jan. 24, 2019.

* cited by examiner

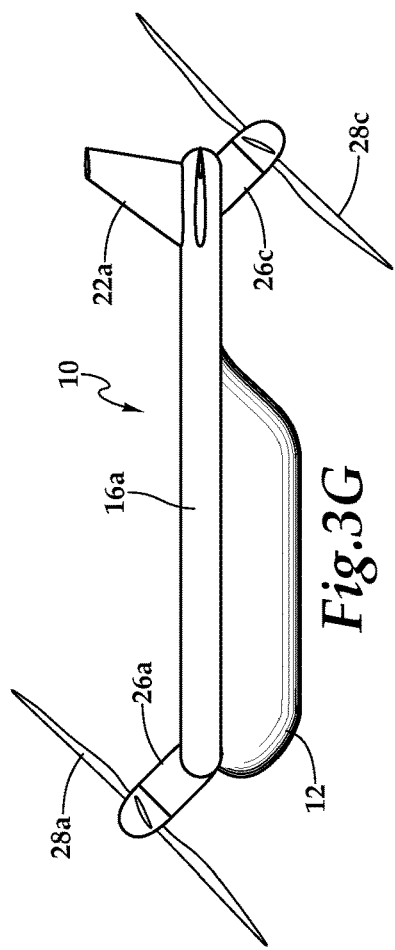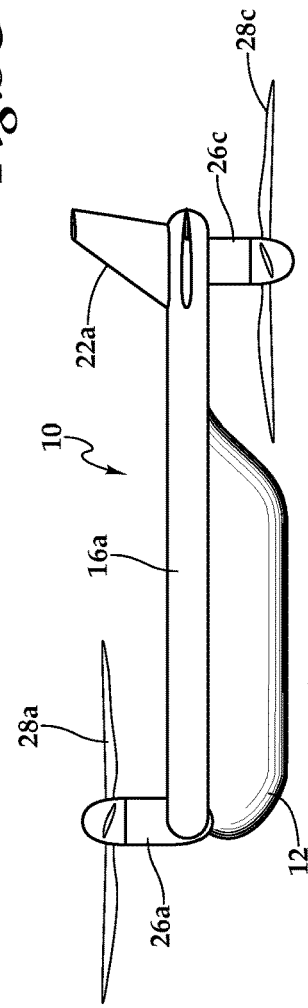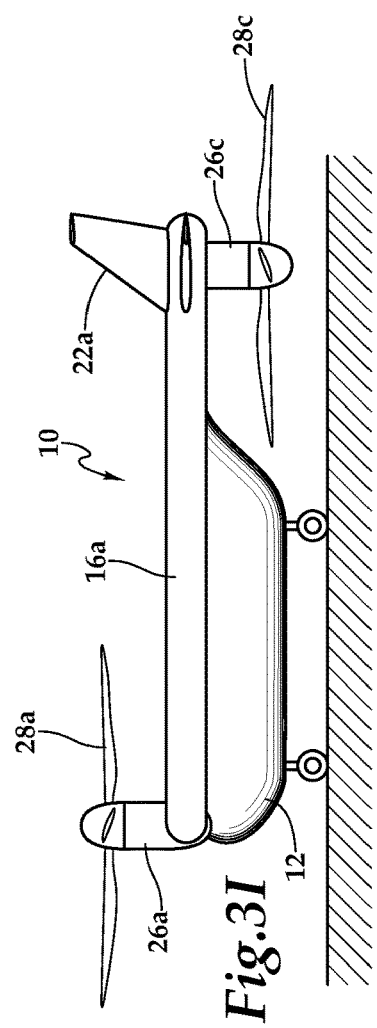

TILTROTOR AIRCRAFT HAVING A DOWNWARDLY TILTABLE AFT ROTOR

TECHNICAL FIELD OF THE DISCLOSURE

The present disclosure relates, in general, to aircraft having a forward flight mode and a vertical takeoff and landing flight mode and, in particular, to tiltrotor aircraft having upwardly tiltable forward rotors and a downwardly tiltable aft rotor that are operable to transition between a forward thrust orientation and a vertical lift orientation.

BACKGROUND

Fixed-wing aircraft, such as airplanes, are capable of flight using wings that generate lift responsive to the forward airspeed of the aircraft, which is generated by forward thrust from one or more jet engines or propellers. The wings have an airfoil cross section that deflects air downwardly as the aircraft moves forward, generating vertical lift to support the airplane in flight. Fixed-wing aircraft, however, require a runway for takeoff and landing.

Unlike fixed-wing aircraft, vertical takeoff and landing (VTOL) aircraft do not require runways. Instead, VTOL aircraft are capable of taking off, hovering and landing vertically. One example of VTOL aircraft is a helicopter, which is a rotorcraft having one or more rotors that provide vertical lift and forward thrust to the aircraft. Helicopter rotors not only enable hovering, vertical takeoff and vertical landing, but also enable, forward, aftward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft utilize tiltable rotor systems that are operable to transition between a forward thrust orientation and a vertical lift orientation. The rotor systems are tiltable relative to a fixed wing such that the associated proprotors have a generally horizontal plane of rotation for vertical takeoff, hovering and vertical landing and a generally vertical plane of rotation for forward flight, wherein the fixed wing provides lift. In this manner, tiltrotor aircraft combine the vertical lift capability of a helicopter with the speed and range of fixed-wing aircraft.

SUMMARY

In a first aspect, the present disclosure is directed to a tiltrotor aircraft having a vertical takeoff and landing flight mode and a forward flight mode. The aircraft includes a longitudinally extending fuselage having an aft end. A wing extends laterally from the fuselage and has first and second oppositely disposed wing tips distal from the fuselage. First and second tip booms respectively extend longitudinally from the first and second wing tips. The first and second tip booms each have forward and aft ends. First and second forward rotors are respectively coupled to the forward ends of the first and second tip booms. The first and second forward rotors are reversibly tiltable between a vertical lift orientation, wherein the first and second forward rotors are above the respective first and second tip booms, and a forward thrust orientation, wherein the first and second forward rotors are forward of the respective first and second tip booms. An aft rotor is coupled to the aft end of the fuselage. The aft rotor is reversibly tiltable between a vertical lift orientation, wherein the aft rotor is below the fuselage, and a forward thrust orientation, wherein the aft rotor is aft of the fuselage.

In certain embodiments, a flight control system may be operably associated with the forward rotors and the aft rotor such that the flight control system is operable to independently control each of the rotors including transitions between the vertical lift and the forward thrust orientations. In such embodiments, the flight control system may command operation of the rotors responsive to onboard pilot flight control, remote flight control, autonomous flight control or any combination thereof. In some embodiments, the forward rotors are counter rotated and utilize differential longitudinal thrust vectoring to control yaw in the vertical takeoff and landing flight mode. In other embodiments, the forward rotors are counter rotated and the aft rotor is torque offset to control yaw in the vertical takeoff and landing flight mode. In further embodiments, the forward rotors are counter rotated and utilize differential longitudinal thrust vectoring and the aft rotor is torque offset to control yaw in the vertical takeoff and landing flight mode. In additional embodiments, the forward rotors are common rotated and the aft rotor is counter rotated to control yaw in the vertical takeoff and landing flight mode. In such embodiments, each of the forward rotors may be smaller than the aft rotor and/or each of the forward rotors may have a lesser pitch than the aft rotor in fixed pitch rotor implementations.

In certain embodiments, first and second tail assemblies may be respectively coupled to the aft ends of the first and second tip booms. In such embodiments, the first and second tail assemblies may operate in an upwash in the forward flight mode. Also, in such embodiments, the first and second tail assemblies may operate in a dynamic pressure ratio of between about 1.0 and about 1.3 in the forward flight mode. In some embodiments, the first and second tail assemblies may include vertical stabilizers, horizontal stabilizers, rudders and/or elevators. In certain embodiments, the wing may include at least one flaperon. In some embodiments, a power system may include at least one electric motor operably associated with each of the rotors and an electric energy source. In such embodiments, the electric energy source may include at least one battery and/or at least one internal combustion engine and at least one electric generator. In certain embodiments, the forward rotors may include folding rotor blades operable to reduce drag in the forward flight mode. In some embodiments, the aft rotor may include fixed pitch rotor blades.

In a second aspect, the present disclosure is directed to a tiltrotor aircraft having a vertical takeoff and landing flight mode and a forward flight mode. The aircraft includes a longitudinally extending fuselage having an aft end. A wing extends laterally from the fuselage and has first and second oppositely disposed wing tips distal from the fuselage. First and second tip booms respectively extend longitudinally from the first and second wing tips. The first and second tip booms each have forward and aft ends. First and second forward rotors are respectively coupled to the forward ends of the first and second tip booms. The first and second forward rotors are reversibly tiltable between a vertical lift orientation, wherein the first and second forward rotors are above the respective first and second tip booms, and a forward thrust orientation, wherein the first and second forward rotors are forward of the respective first and second tip booms. First and second tail assemblies are respectively coupled to the aft ends of the first and second tip booms. The first and second tail assemblies operate in an upwash in the forward flight mode. An aft rotor is coupled to the aft end of the fuselage. The aft rotor is reversibly tiltable between a vertical lift orientation, wherein the aft rotor is below the fuselage, and a forward thrust orientation, wherein the aft rotor is aft of the fuselage. A flight control system is operably associated with the forward rotors and the aft rotor. The flight control system is operable to independently control each of the rotors including transitions between the vertical lift and the forward thrust orientations. A power system includes at least one electric motor operably associated with each of the rotors and an electric energy source.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3I are schematic illustrations of a tiltrotor aircraft having upwardly tiltable forward rotors and a downwardly tiltable aft rotor in a sequential flight operating scenario in accordance with embodiments of the present disclosure.

DETAILED DESCRIPTION

Figure 1B:
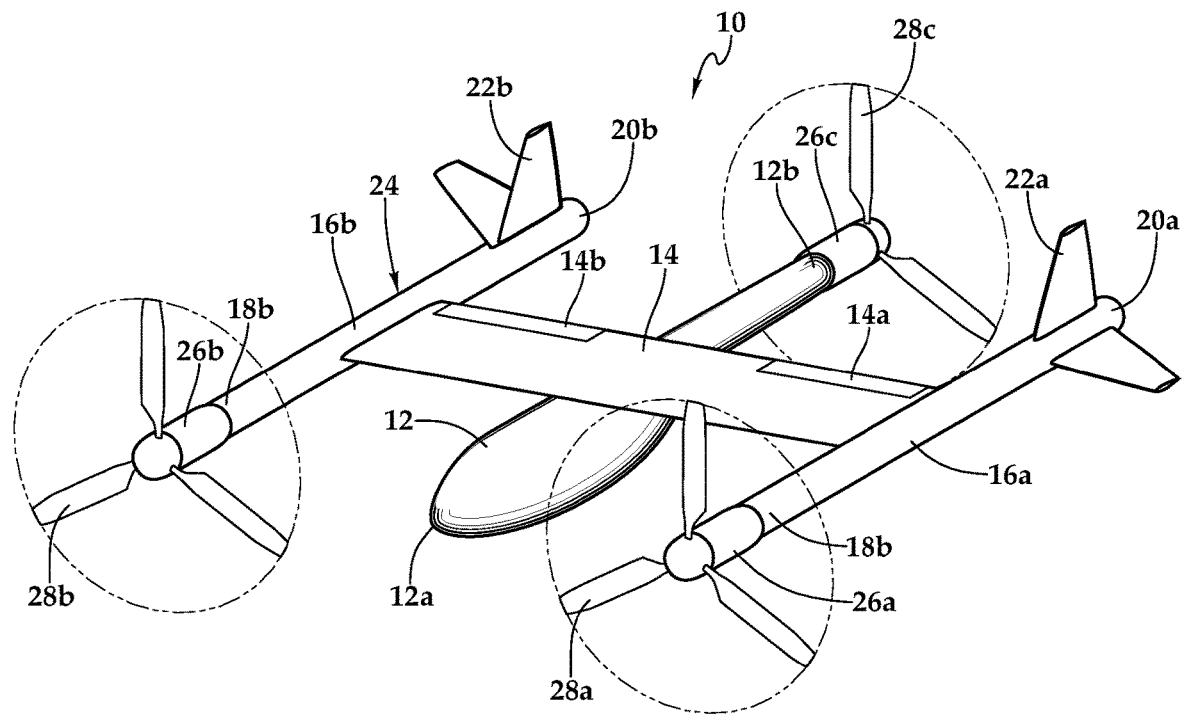
FIGS. 1A-1H are schematic illustrations of a tiltrotor aircraft having upwardly tiltable forward rotors and a downwardly tiltable aft rotor in accordance with embodiments of the present disclosure.
Figure 1A:
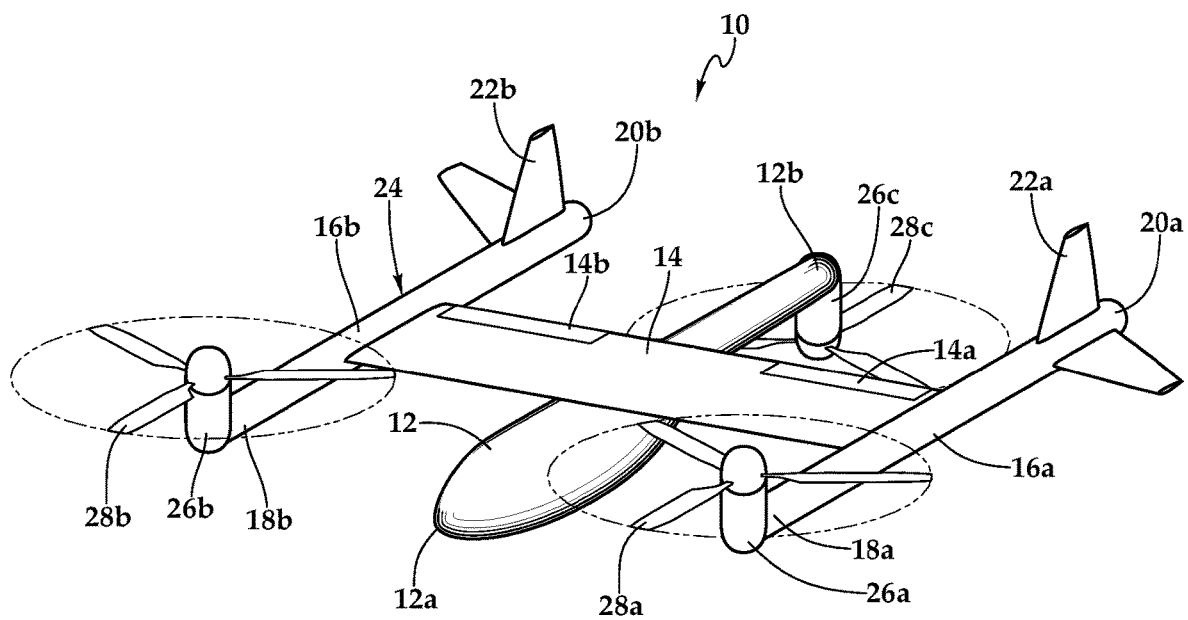
Figure 1D:
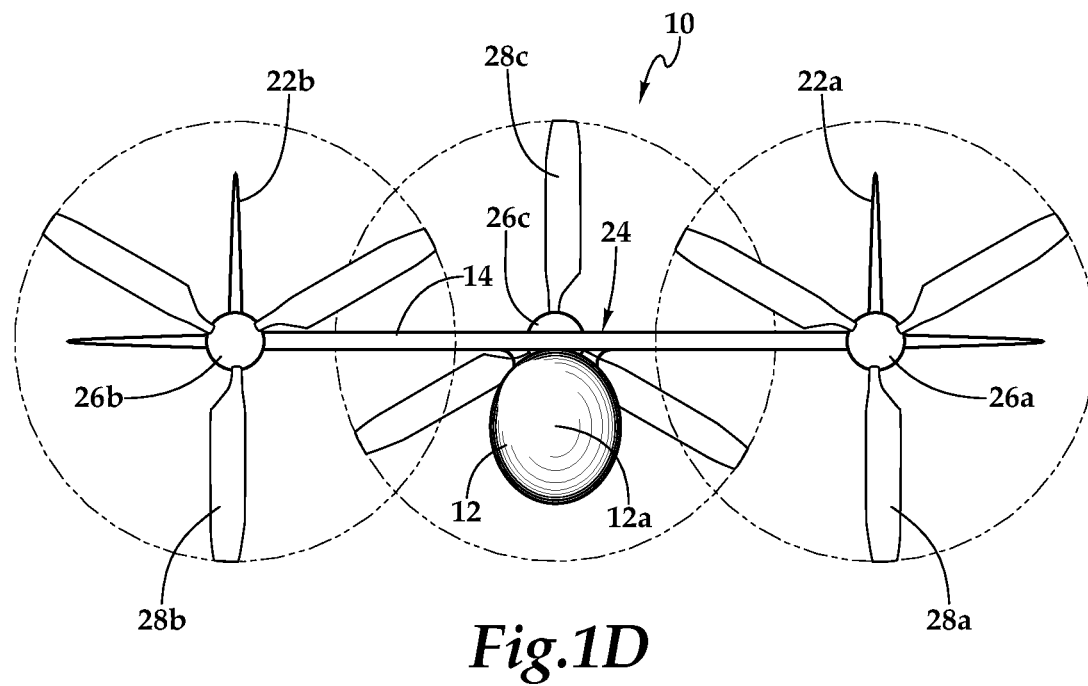
Figure 1C:
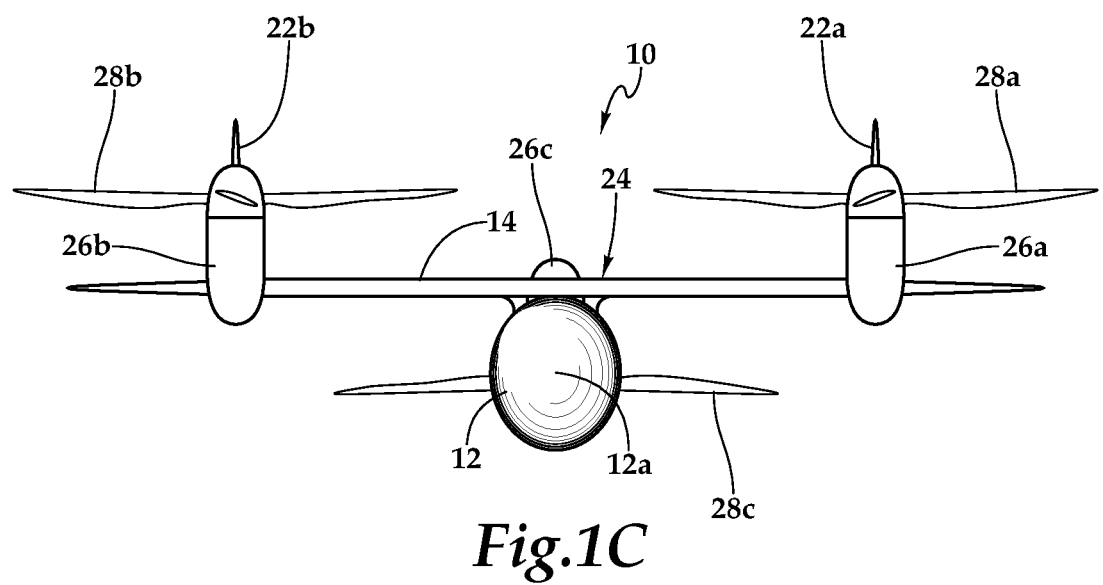
Figure 1F:
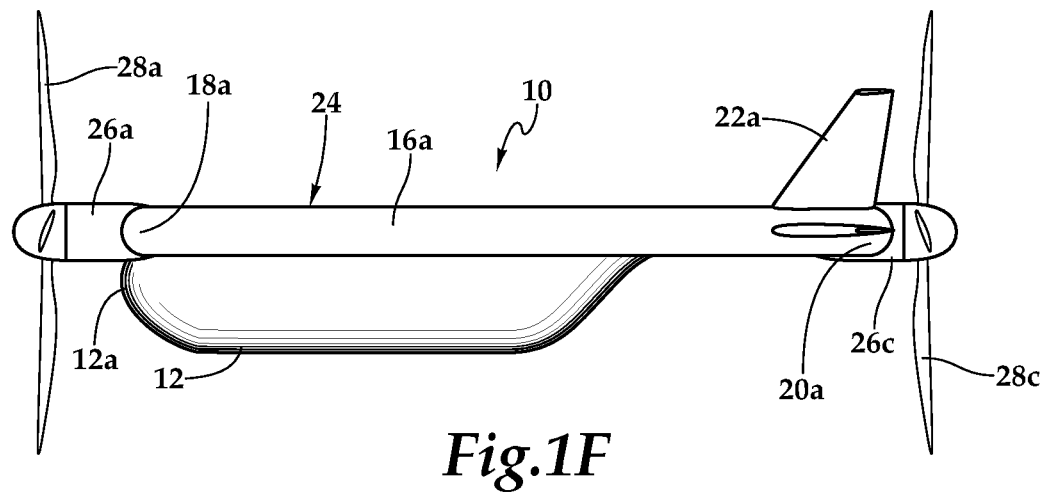
Figure 1E:
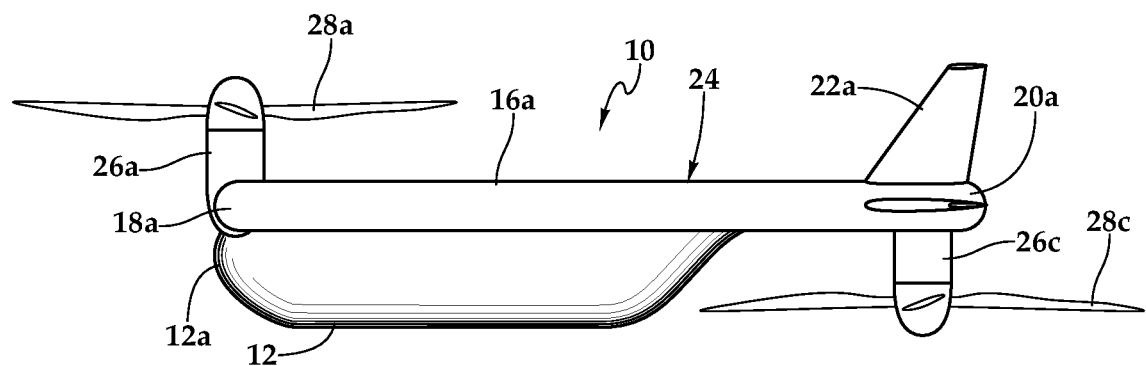
Figure 1H:
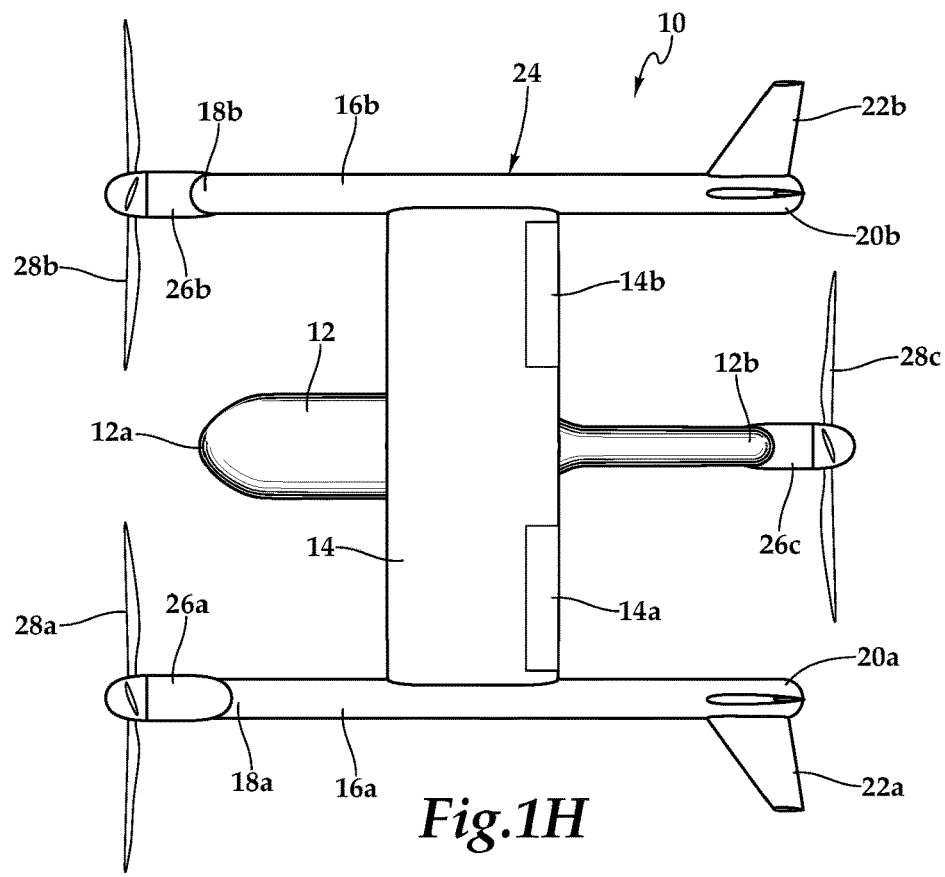
Figure 1G:
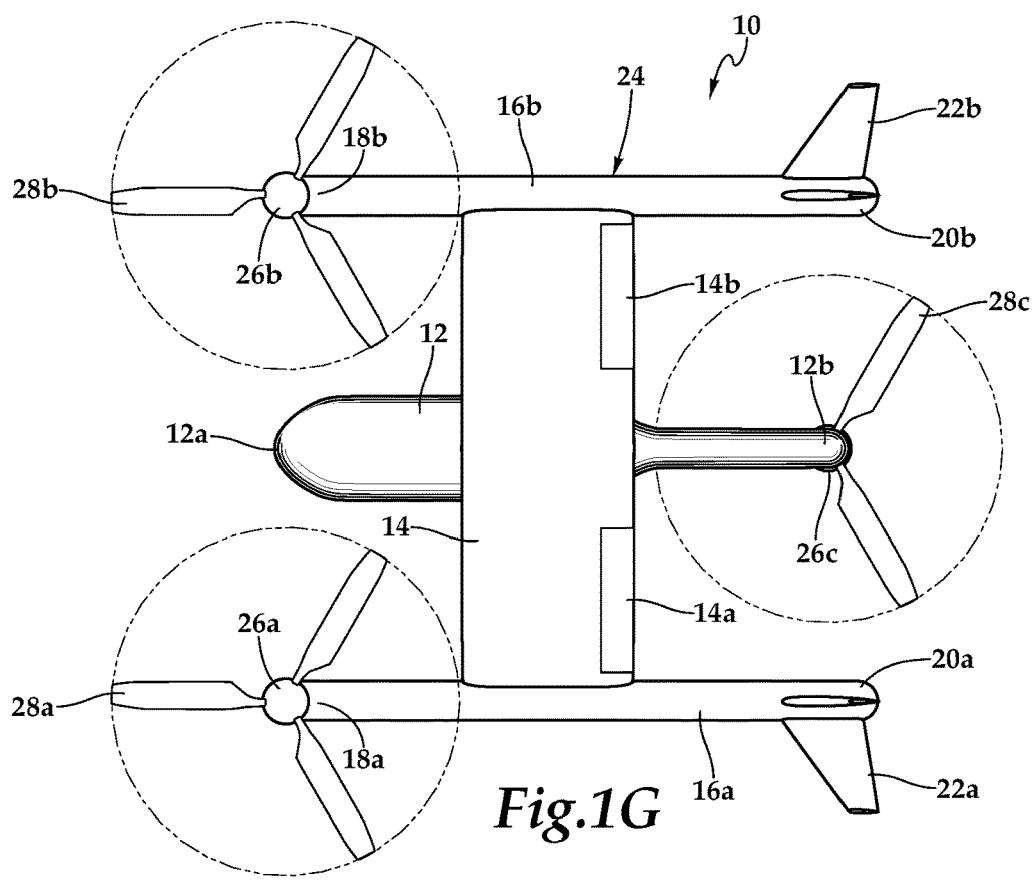

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Referring to FIGS. 1A-1H in the drawings, various views of a tiltrotor aircraft 10 having upwardly tiltable forward rotors and a downwardly tiltable aft rotor are depicted. In the illustrated embodiment, aircraft 10 has a longitudinally extending fuselage 12 that includes a forward end or nose 12a and an aft end or tail 12b. Aircraft 10 includes a wing 14 that extends laterally from both sides of fuselage 12. Wing 14 has an airfoil cross-section that generates lift responsive to the forward airspeed of aircraft 10. In the illustrated embodiment, wing 14 includes flaperons 14a, 14b that provide aerodynamic surfaces for controlling, for example, pitch and roll of aircraft 10 during forward flight. Wing 14 also includes oppositely disposed wing tips 14c, 14d that are distal from fuselage 12. Wing 14 is preferably formed from high strength and lightweight materials such as metals, polymers, fiberglass, carbon and combinations thereof.

Aircraft 10 includes a pair of tip booms 16a, 16b that respectively extend longitudinally from wing tips 14c, 14d. Tip boom 16a includes a forward end 18a and an aft end 20a. Tip boom 16b includes a forward end 18b and an aft end 20b. Tip booms 16a, 16b are preferably formed from high strength and lightweight materials such as metals, polymers, fiberglass, carbon and combinations thereof. Aft end 20a of tip boom 16a supports a tail assembly 22a depicted as a horizontal stabilizer that may include a rudder and vertical stabilizer that may include an elevator to aid in pitch and yaw stability during forward flight of aircraft 10. Likewise, aft end 20b of tip boom 16b supports a tail assembly 22b depicted as a horizontal stabilizer that may include a rudder and vertical stabilizer that may include an elevator to aid in pitch and yaw stability during forward flight of aircraft 10. Wing 14 and tip booms 16a, 16b preferably include internal passageways operable to contain communication lines such as electrical cables, data cables and the like. Together, fuselage 12, wing 14 and tip booms 16a, 16b as well as various frames, supports, longerons, stringers, bulkheads, spars, ribs, skins and the like may be considered to be the airframe 24 of aircraft 10.

Aircraft 10 is operable to transition between a vertical lift orientation, as best seen in FIGS. 1A, 1C, 1E, 1G, and a forward thrust orientation, as best seen in FIGS. 1B, 1D, 1F, 1H. In the illustrated embodiment, a distributed propulsion system is coupled to airframe 24. The distributed propulsion system includes a plurality of propulsion assemblies 26 that may be permanently mounted or independently attachable to and detachable from airframe 24. As illustrated, the distributed propulsion system includes three independently operating propulsion assemblies 26a, 26b, 26c. Propulsion assemblies 26a, 26b are respectively coupled to forward ends 18a, 18b of tip booms 16a, 16b and may be referred to as forward propulsion assemblies 26a, 26b. Propulsion assembly 26c is coupled to aft end 12b of fuselage 12 and may be referred to as aft propulsion assembly 26c. Forward propulsion assembly 26a is reversibly tiltable between a vertical lift orientation, wherein rotor 28a is above tip boom 16a, and a forward thrust orientation, wherein rotor 28a is forward of tip boom 16a. Similarly, forward propulsion assembly 26b is reversibly tiltable between a vertical lift orientation, wherein rotor 28b is above tip boom 16b, and a forward thrust orientation, wherein rotor 28*b* is forward of tip boom 16*b*. Aft propulsion assembly 26*c* is reversibly tiltable between a vertical lift orientation, wherein rotor 28*c* is below aft end 12*b* of fuselage 12, and a forward thrust orientation, wherein rotor 28*c* is aft of fuselage 12. In the illustrated embodiment, when propulsion assemblies 26*a*, 26*b*, 26*c* are in the forward thrust orientation, rotors 28*a*, 28*b* operate as tractor propellers and rotor 28*c* operates as a pusher propeller.

As discussed herein, each propulsion assembly 26*a*, 26*b*, 26*c* is independently controllable such that operational changes of certain propulsion assemblies 26*a*, 26*b*, 26*c* within the distributed propulsion system enable pitch, yaw and roll control of aircraft 10 during VTOL operations. For example, by changing the thrust output of forward propulsion assemblies 26*a*, 26*b* relative to aft propulsion assembly 26*c*, pitch control is achieved. As another example, by changing the thrust output of propulsion assembly 26*a* relative to propulsion assembly 26*b*, roll control is achieved. Changing the thrust output of a particular propulsion assembly 26*a*, 26*b*, 26*c* may be accomplished by changing the rotational speed and/or blade pitch of the respective rotors 28*a*, 28*b*, 28*c*. It is noted that some or all of propulsion assemblies 26*a*, 26*b*, 26*c* may incorporate fixed pitch rotors. Alternatively, some or all of propulsion assemblies 26*a*, 26*b*, 26*c* may incorporate rotors operable for collective and/or cyclic pitch control. In one implementation, forward propulsion assemblies 26*a*, 26*b* have collective pitch control and aft propulsion assembly 26*c* has a fixed pitch rotor.

Yaw control or torque balance of aircraft 10 during VTOL operations may be achieved in a variety of ways. In the illustrated embodiment, forward propulsion assemblies 26*a*, 26*b* counter rotate with aft propulsion assembly 26*c* rotating in common with forward propulsion assembly 26*a*. One way to counteract the torque imbalance is to utilize differential longitudinal thrust vectoring of forward propulsion assemblies 26*a*, 26*b*. For example, forward propulsion assembly 26*a* may be tilted forward while forward propulsion assembly 26*b* may be tilted aftward to generate thrust vectors that counteract the torque imbalance. Another way to counteract the torque imbalance is to utilize torque offset of aft propulsion assembly 26*c*. For example, aft propulsion assembly 26*c* may be tilted starboard to generate a thrust vector that counteracts the torque imbalance. As another alternative, differential longitudinal thrust vectoring of forward propulsion assemblies 26*a*, 26*b* may be used together with torque offset of aft propulsion assembly 26*c* to counteract the torque imbalance. In other embodiments, forward propulsion assemblies 26*a*, 26*b* may rotate in a common direction with aft propulsion assembly 26*c* counter rotating relative to forward propulsion assemblies 26*a*, 26*b*. In this implementation, changing the thrust output of forward propulsion assemblies 26*a*, 26*b* relative to aft propulsion assembly 26*c* provides torque balance control. This may be achieved responsive to changes in rotor speed and/or changes in blade pitch. In such implementation, it may be desirable to utilize forward rotors that are smaller and/or have less mass than the aft rotor. Alternatively or additionally in fixed pitch implementations, it may be desirable to utilize forward rotors that have a lesser pitch than the aft rotor.

Propulsion assemblies 26*a*, 26*b*, 26*c* may preferably be standardized and interchangeable units that are most preferably line replaceable units enabling easy installation and removal from aircraft 10. In addition, the use of line replaceable units is beneficial in maintenance situations if a fault is discovered with one of the propulsion assemblies. In this case, the faulty propulsion assembly can be decoupled from aircraft 10 by simple operations such as unbolting structural members, disconnecting communication lines and other suitable procedures. Another propulsion assembly can then be attached to aircraft 10 by coupling communication lines, bolting structural members together and other suitable procedures.

Figure 2:
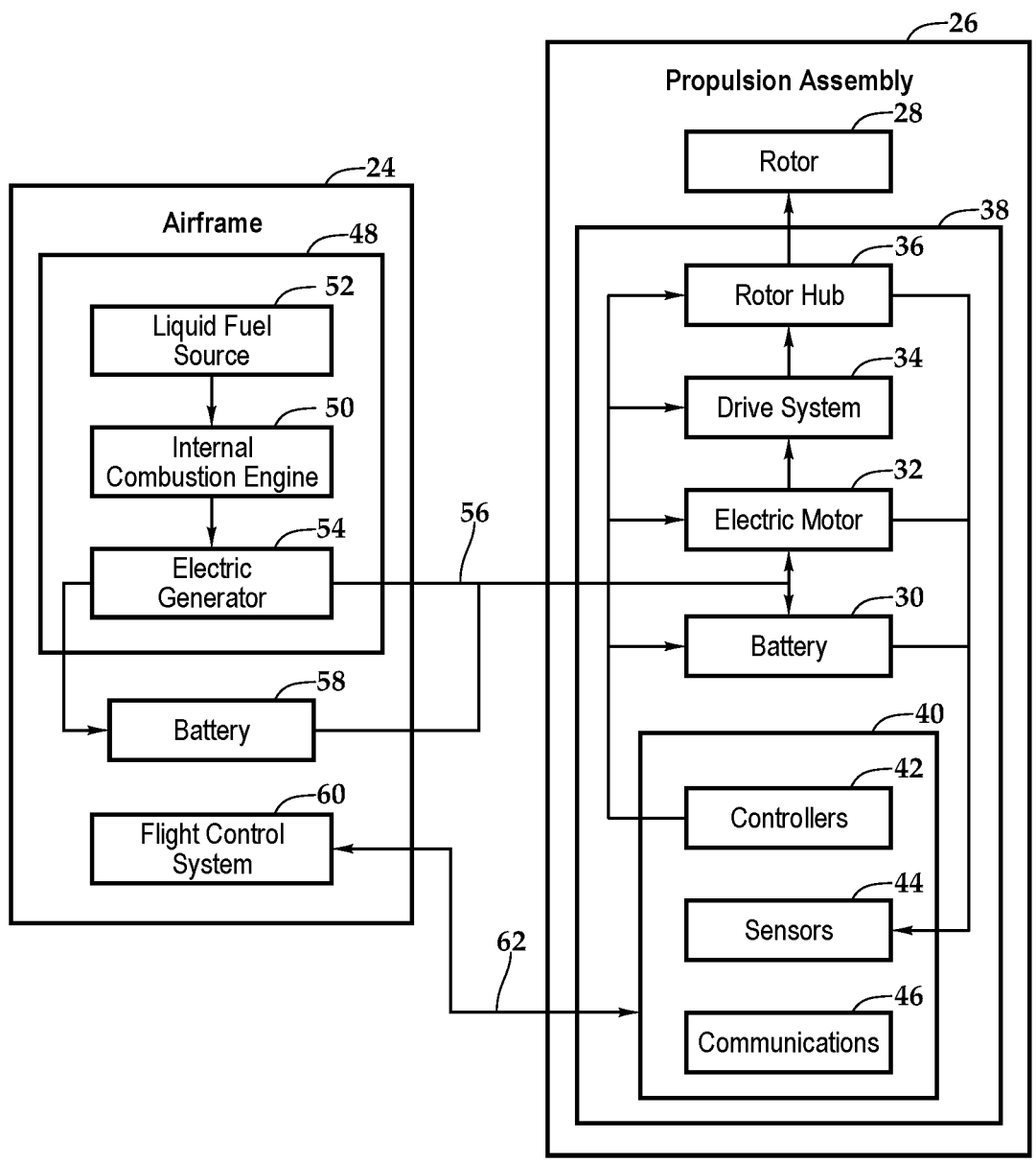
FIG. 2 is block diagram of a propulsion and control system for a tiltrotor aircraft having upwardly tiltable forward rotors and a downwardly tiltable aft rotor in accordance with embodiments of the present disclosure.

As best seen in FIG. 2, each propulsion assembly 26 includes a nacelle 38 that houses one or more batteries 30, an electric motor 32, a drive system 34, a rotor hub 36 and an electronics node 40 including, for example, controllers 42, sensors 44 and communications elements 46 as well as other components suitable for use in the operation of a propulsion assembly. Each propulsion assembly 26 also includes a rotor 28 having a plurality of rotor blades that are securably attached to rotor hub 36. The rotor blades may have a fixed pitch or may be operable for pitch changes including, for example, collective and/or cyclic pitch changes. In addition, each propulsion assembly 26 may be operable for independent thrust vectoring.

In the illustrated embodiment, aircraft 10 has an electrical energy source depicted as a liquid fuel based electrical energy generation system 48 that is housed within airframe 24 such as within fuselage 12, wing 14 and/or tip booms 16*a*, 16*b*. Electrical energy generation system 48 preferably includes one or more internal combustion engines 50. Electrical energy generation system 48 also includes one or more fuel tanks depicted as liquid fuel sources 52. In operation, internal combustion engine 50 is used to drive an electric generator 54 to produce electrical energy. This electrical energy is feed to each propulsion assemblies 26 via communication lines 56 within airframe 24 to directly power electric motors 32 and/or for storage within batteries 30. This type of hybrid power system is beneficial as the energy density of liquid fuel exceeds that of batteries enabling greater endurance for aircraft 10.

Alternatively or additionally, airframe 24 may house one or more batteries 58 that may serve as the electrical energy source for propulsion assemblies 26. Batteries 58 may be charged by electrical energy generation system 48 and/or may be charged at a ground station. Batteries 58 may also be interchangeably removed and installed to enable efficient refueling which may be particularly beneficial in embodiments of aircraft 10 wherein the sole electrical energy source are batteries 58. In embodiments having both batteries 58 and electrical energy generation system 48, batteries 58 may provide a backup electrical power source to enable aircraft 10 to safely land in the event of a failure in electrical energy generation system 48. As another alternative, propulsion assemblies 26 may include hydraulic motors operated within a common hydraulic fluid system wherein one or more high pressure hydraulic sources or generators are housed within airframe 24 to provide power to each of the hydraulic motors.

In the illustrated embodiment, aircraft 10 has a flight control system 60 that is housed within airframe 24. Flight control system 60, such as a digital flight control system, is preferably a redundant flight control system and more preferably a triply redundant flight control system including three independent flight control computers. Use of triply redundant flight control system 60 improves the overall safety and reliability of aircraft 10 in the event of a failure in flight control system 60. Flight control system 60 preferably includes non-transitory computer readable storage media including a set of computer instructions executable by one or more processors for controlling the operation of the distributed propulsion system. Flight control system 60 may be implemented on one or more general-purpose computers, special purpose computers or other machines with memory and processing capability. For example, flight control system 60 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 60 may be a microprocessor-based system operable to execute program code in the form of machine-executable instructions. In addition, flight control system 60 may be selectively connectable to other computer systems via a proprietary encrypted network, a public encrypted network, the Internet or other suitable communication network that may include both wired and wireless connections.

Flight control system 60 communicates via a wired and/or wireless communications network 62 with electronics node 40 of each propulsion assembly 26. Flight control system 60 receives sensor data from and sends flight command information to electronics nodes 40 such that each propulsion assembly 26 may be individually and independently controlled and operated. In both manned and unmanned missions, flight control system 60 may autonomously control some or all aspects of flight operation for aircraft 10. Flight control system 60 may also be operable to communicate with one or more remote systems, via a wireless communications protocol. The remote systems may be operable to receive flight data from and provide commands to flight control system 60 to enable remote flight control over some or all aspects of flight operation for aircraft 10, in both manned and unmanned missions. In manned missions, a pilot within aircraft 10 may receive flight data from and provide commands to flight control system 60 to enable onboard pilot control over some or all aspects of flight operation for aircraft 10. In particular, transitions of aircraft 10 between the vertical lift orientation and the forward thrust orientation may be accomplished responsive to onboard pilot flight control, remote flight control, autonomous flight control and combinations thereof.

As best seen in FIGS. 1A, 1C, 1E, 1G, aircraft 10 has a vertical takeoff and landing flight mode wherein the distributed propulsion system is in its vertical lift orientation with rotor 28a of forward propulsion assembly 26a above tip boom 16a, rotor 28b of forward propulsion assembly 26b above tip boom 16b and rotor 28c of aft propulsion assembly 26c below aft end 12b of fuselage 12. In this configuration, each rotor 28a, 28b, 28c has a generally horizontal orientation taking into account the attitude of aircraft 10. Flight control system 60 independently controls and operates each propulsion assembly 26a, 26b, 26c to generate lift as well as provide pitch, yaw and roll control. In the illustrated configuration, the propwash generated by forward propulsion assemblies 26a, 26b creates a minimum download on airframe 24 impeded only by forward ends 18a, 18b of tip booms 16a, 16b. The propwash generated by aft propulsion assembly 26c is entirely unimpeded by airframe 24 and thus creates no download on airframe 24. This unique configuration of propulsion assemblies 26a, 26b, 26c on airframe 24 provides high lift efficiency for aircraft 10.

As best seen in FIGS. 1B, 1D, 1F, 1H, aircraft 10 has a forward flight mode wherein the distributed propulsion system is in its forward thrust orientation with rotor 28a of forward propulsion assembly 26a forward of tip boom 16a, rotor 28b of forward propulsion assembly 26b forward of tip boom 16b and rotor 28c of aft propulsion assembly 26c aft of fuselage 12. Each rotor 28a, 28b, 28c has a generally vertical orientation taking into account the attitude of aircraft 10. Flight control system 60 independently controls and operates each propulsion assembly 26a, 26b, 26c to generate the required thrust with wing 14 providing lift and with aerodynamic surfaces including as flaperons 14a, 14b and tail assemblies 22a, 22b providing pitch, yaw and roll control. In the illustrated configuration, the propwash generated by forward propulsion assemblies 26a, 26b travels generally in the chordwise direction of wing 14 and the propwash generated by aft propulsion assembly 26c is entirely unimpeded by airframe 24. Due to the configuration of airframe 24, tail assemblies 22a, 22b operate in an upwash of wing 14 in the forward flight mode. For example, tail assemblies 22a, 22b operate in a dynamic pressure ratio of between about 1.0 and about 1.3 in the forward flight mode which contributes to the stability of aircraft 10 in forward flight mode. In addition, as the thrust requirements in forward flight mode are reduced compared to the lift requirements of vertical takeoff and landing flight mode, during forward flight, flight control system 60 may reduce the rotational speeds of some or all of propulsion assemblies 26a, 26b, 26c. Alternatively or additionally, flight control system 60 may shut down certain of the propulsion assemblies 26a, 26b, 26c during forward flight, in which case, the associated rotor blades may be allowed to windmill, may be locked against rotation or may be folded and locked. For example, flight control system 60 may shut down forward propulsion assemblies 26a, 26b while operating aft propulsion assembly 26c during forward flight.

Figure 3C:
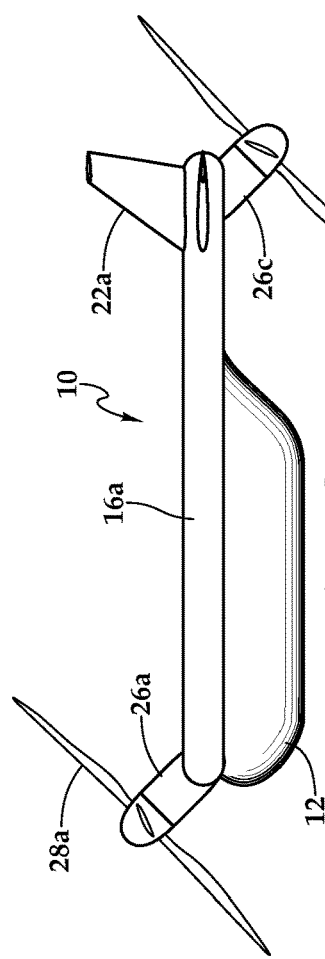
Figure 3B:
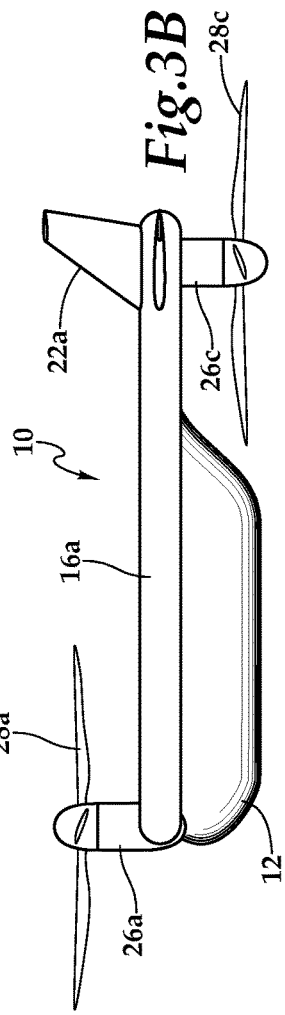
Figure 3A:
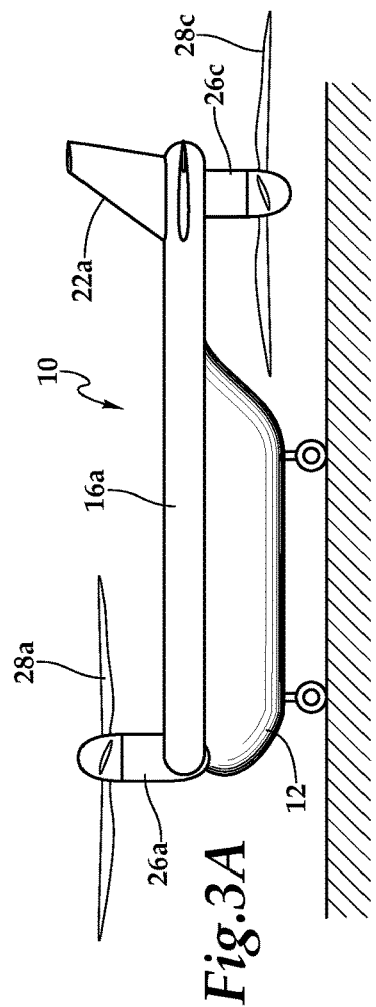

Referring next to FIGS. 3A-3I in the drawings, a sequential flight-operating scenario of aircraft 10 is depicted. As best seen in FIG. 3A, aircraft 10 is positioned on a launch surface at a current location. Aircraft 10 is in the vertical lift orientation with all propulsion assemblies 26 operating. Aircraft 10 may be operating responsive to autonomous flight control, remote flight control, onboard pilot flight control or any combination thereof. For example, it may be desirable to utilize onboard pilot flight control during certain maneuvers such as takeoff and landing but rely on remote or autonomous flight control during hover, forward flight and/or transitions between forward flight and VTOL operations.

Figure 3D:
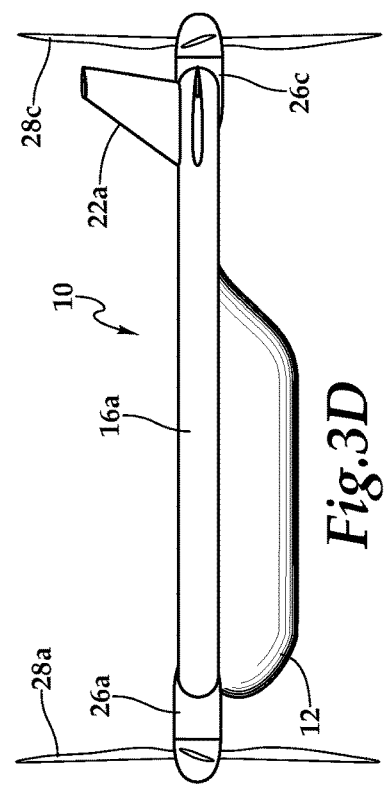

Regardless of the chosen flight control mode, each of the propulsion assemblies 26 is independently controllable during flight operations. For example, as best seen in FIG. 3B, to aid in stabilization during VTOL operations including pitch, roll and yaw control during hover, it may be desirable to adjust the thrust output, torque output and/or thrust vector of one or more of propulsion assemblies 26 as discussed herein. After vertical assent to the desired elevation, aircraft 10 may begin the transition from vertical takeoff to forward flight. As best seen in FIGS. 3B-3D, as aircraft 10 transitions from vertical takeoff and landing flight mode to forward flight mode, the forward propulsion assemblies transition from the vertical lift orientation, as best seen in FIG. 3B, to the forward thrust orientation, as best seen in FIG. 3D, by tilting from an upwardly pointing orientation to a forward pointing orientation. Likewise, the aft propulsion assembly transitions from the vertical lift orientation, as best seen in FIG. 3B, to the forward thrust orientation, as best seen in FIG. 3D, by tilting from a downwardly pointing orientation to an aftwardly pointing orientation. It is noted that aircraft 10 remains in a generally horizontal attitude during this transition for the safety and comfort of passengers, crew and/or cargo carried in aircraft 10.

Figure 3E:
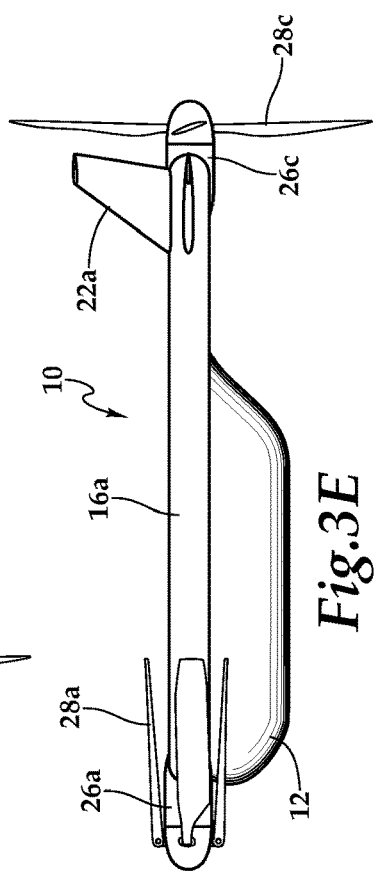

Once aircraft 10 has completed the transition to forward flight mode, certain of the propulsion assemblies 26 may be operated at reduced speed or shut down as the thrust requirements in forward flight mode are reduced compared to the thrust requirements of vertical takeoff and landing flight mode. For example, as best seen in FIG. 3E, the forward propulsion assemblies have been shut down and the rotor blades have folded to reduce drag. Alternatively, after the forward propulsion assemblies have been shut down the rotor blades may be feathered with the rotor hubs unlock allowing the rotors to windmill or the rotors may be locked from rotating without folding.

Figure 3F:
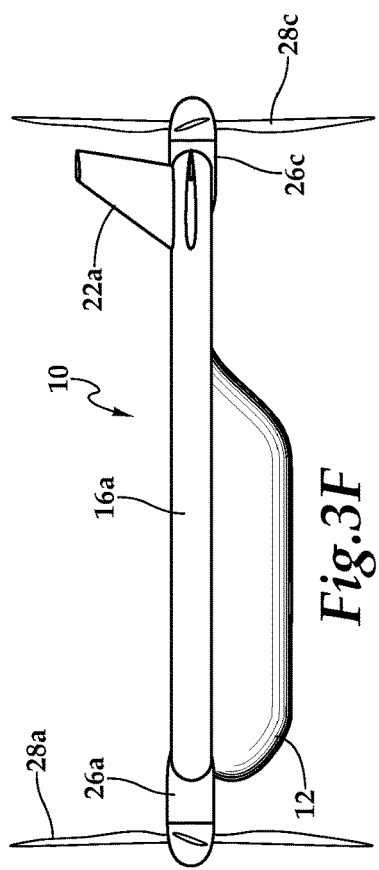

When aircraft 10 begins its approaches to the destination, any propulsion assemblies 26 that were shut down or operated at a reduced speed are reengaged to provide full propulsion capabilities, as best seen in 3F. Aircraft 10 may now begin its transition from forward flight mode to vertical takeoff and landing flight mode. As best seen in FIGS. 3F-3H, as aircraft 10 transitions from forward flight mode to vertical takeoff and landing flight mode, the forward propulsion assemblies transition from the forward thrust orientation, as best seen in FIG. 3F, to the vertical lift orientation, as best seen in FIG. 3H, by tilting from the forward pointing orientation to the upward pointing orientation. Likewise, the aft propulsion assembly transitions from the forward thrust orientation, as best seen in FIG. 3F, to the vertical lift orientation, as best seen in FIG. 3H, by tilting from the aftwardly pointing orientation to the downwardly pointing orientation. It is noted that aircraft 10 remains in a generally horizontal attitude during this transition for the safety and comfort of passengers, crew and/or cargo carried in aircraft 10. Once aircraft 10 has completed the transition to vertical takeoff and landing flight mode, as best seen in FIG. 3H, aircraft 10 may commence its vertical descent to a landing surface at the destination location. As best seen in FIG. 3I, aircraft 10 has landed and is resting on the surface. Aircraft 10 may now engage in ground maneuvers, if desired.

Figure 4:
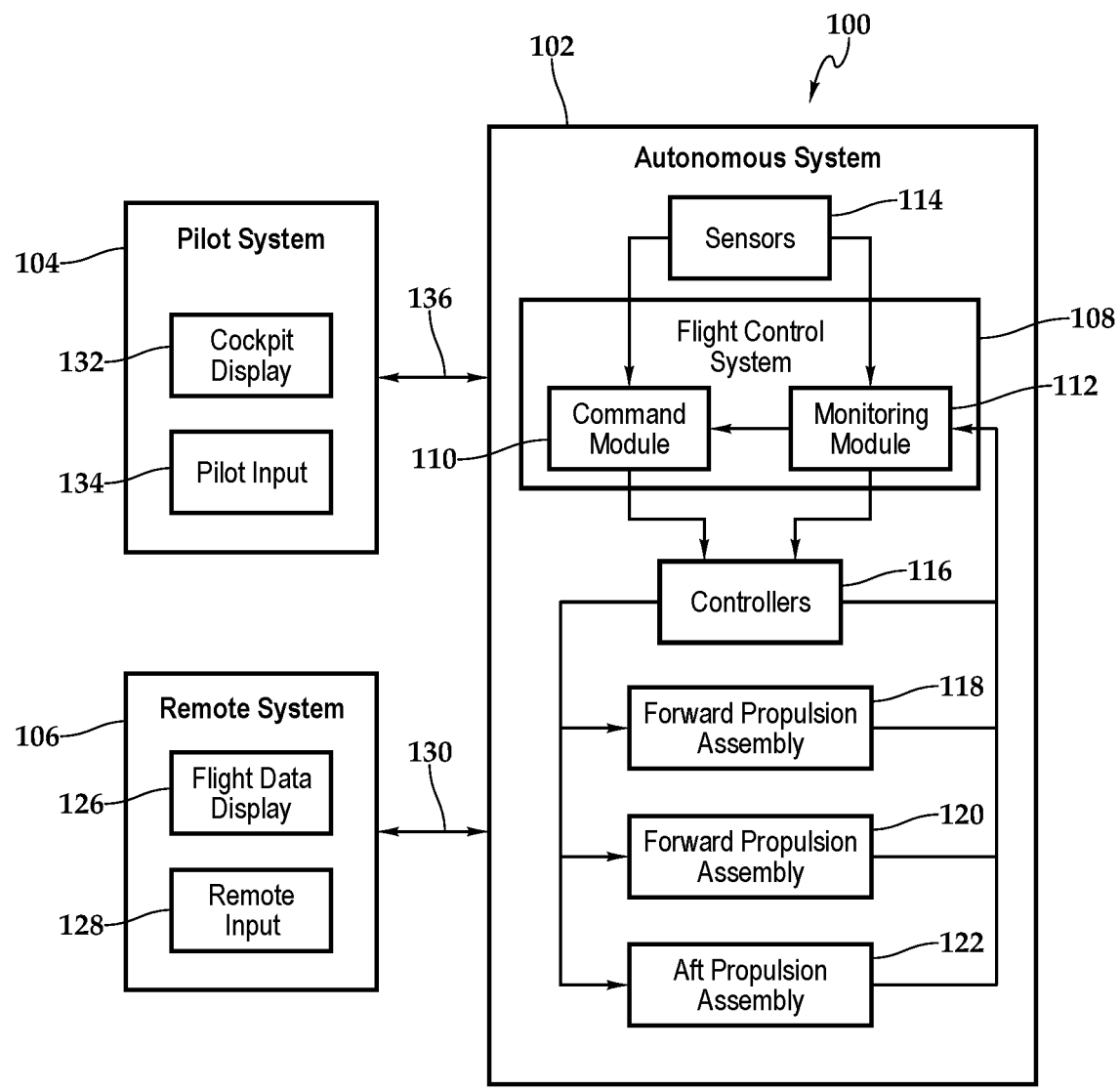
FIG. 4 is a block diagram of a control system for a tiltrotor aircraft having upwardly tiltable forward rotors and a downwardly tiltable aft rotor in accordance with embodiments of the present disclosure.

Referring additionally to FIG. 4 in the drawings, a block diagram depicts an aircraft control system 100 operable for use with aircraft 10 of the present disclosure. In the illustrated embodiment, system 100 includes three primary computer based subsystems; namely, an autonomous system 102, a pilot system 104 and a remote system 106. As discussed herein, the aircraft of the present disclosure may be operated autonomously responsive to commands generated by flight control system 108 that preferably includes a non-transitory computer readable storage medium including a set of computer instructions executable by a processor. Flight control system 108 may be a triply redundant system implemented on one or more general-purpose computers, special purpose computers or other machines with memory and processing capability. For example, flight control system 108 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 108 may be a microprocessor-based system operable to execute program code in the form of machine-executable instructions. In addition, flight control system 108 may be selectively connectable to other computer systems via a proprietary encrypted network, a public encrypted network, the Internet or other suitable communication network that may include both wired and wireless connections.

In the illustrated embodiment, flight control system 108 includes a command module 110 and a monitoring module 112. It is to be understood by those skilled in the art that these and other modules executed by flight control system 108 may be implemented in a variety of forms including hardware, software, firmware, special purpose processors and combinations thereof. Flight control system 108 receives input from a variety of sources including internal sources such as sensors 114, controllers 116, propulsion assemblies 118, 120, 122 and pilot system 104 as well as external sources such as remote system 106, global positioning system satellites or other location positioning systems and the like. For example, flight control system 108 may receive a flight plan including starting and ending locations for a mission from pilot system 104 and/or remote system 106. Thereafter, flight control system 108 is operable to autonomously control all aspects of flight of an aircraft of the present disclosure.

For example, during the various operating modes of aircraft 10 including vertical takeoff and landing flight mode, hover flight mode, forward flight mode and transitions therebetween, command module 110 provides commands to controllers 116. These commands enable independent operation of each propulsion assembly 118, 120, 122 including, for example, controlling the rotational speed of the rotors, changing the pitch of the rotor blades, adjusting the thrust vectors and the like. In addition, these commands enable transition of aircraft 10 between the vertical lift orientation and the forward thrust orientation. Flight control system 108 receives feedback from controllers 116 and each propulsion assembly 118, 120, 122. This feedback is processes by monitoring module 112 that can supply correction data and other information to command module 110 and/or controllers 116. Sensors 114, such as positioning sensors, attitude sensors, speed sensors, environmental sensors, fuel sensors, temperature sensors, location sensors and the like also provide information to flight control system 108 to further enhance autonomous control capabilities.

Some or all of the autonomous control capability of flight control system 108 can be augmented or supplanted by a remote flight control system 106. Remote system 106 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 106 communicates with flight control system 108 via a communication link 130 that may include both wired and wireless connections.

Remote system 106 preferably includes one or more flight data display devices 126 configured to display information relating to one or more aircraft of the present disclosure. Display devices 126 may be configured in any suitable form, including, for example, liquid crystal displays, light emitting diode displays, cathode ray tube displays or any suitable type of display. Remote system 106 may also include audio output and input devices such as a microphone, speakers and/or an audio port allowing an operator to communicate with, for example, a pilot on board aircraft 10. The display device 126 may also serve as a remote input device 128 if a touch screen display implementation is used, however, other remote input devices, such as a keyboard or joysticks, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from pilot system 104. Pilot system 104 may be integrated with autonomous system 102 or may be a standalone system preferably including a non-transitory computer readable storage medium including a set of computer instructions executable by a processor and may be implemented by a general-purpose computer, a special purpose computer or other machine with memory and processing capability. Pilot system 104 may include one or more memory storage modules including, but is not limited to, internal storage memory such as random access memory, non-volatile memory such as read only memory, removable memory such as magnetic storage memory, optical storage memory, solid-state storage memory or other suitable memory storage entity. Pilot system 104 may be a microprocessor-based system operable to execute program code in the form of machine-executable instructions. In addition, pilot system 104 may be connectable to other computer systems via a proprietary encrypted network, a public encrypted network, the Internet or other suitable communication network that may include both wired and wireless connections. Pilot system 104 may communicate with flight control system 108 via a communication channel 136 that preferably includes a wired connection.

Pilot system 104 preferably includes a cockpit display device 132 configured to display information to an onboard pilot. Cockpit display device 132 may be configured in any suitable form, including, for example, as one or more display screens such as liquid crystal displays, light emitting diode displays and the like or any other suitable display type including, for example, a display panel, a dashboard display, an augmented reality display or the like. Pilot system 104 may also include audio output and input devices such as a microphone, speakers and/or an audio port allowing an onboard pilot to communicate with, for example, air traffic control or an operator of a remote system. Cockpit display device 132 may also serve as a pilot input device 134 if a touch screen display implementation is used, however, other user interface devices may alternatively be used to allow an onboard pilot to provide control commands to an aircraft being operated responsive to onboard pilot control including, for example, a control panel, mechanical control devices or other control devices. As should be apparent to those having ordinarily skill in the art, through the use of system 100, an aircraft of the present disclosure can be operated responsive to a flight control protocol including autonomous flight control, remote flight control or onboard pilot flight control and combinations thereof.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tiltrotor aircraft having a vertical takeoff and landing flight mode and a forward flight mode, the aircraft comprising:
   a longitudinally extending fuselage having an aft end;
   a wing extending laterally from the fuselage having first and second oppositely disposed wing tips distal from the fuselage;
   first and second tip booms respectively extending longitudinally from the first and second wing tips, the first and second tip booms each having forward and aft ends;
   first and second forward rotors respectively coupled to the forward ends of the first and second tip booms, the first and second forward rotors reversibly tiltable between a vertical lift orientation, wherein the first and second forward rotors are above the respective first and second tip booms, and a forward thrust orientation, wherein the first and second forward rotors are forward of the respective first and second tip booms; and
   an aft rotor coupled to the aft end of the fuselage, the aft rotor reversibly tiltable between a vertical lift orientation, wherein the aft rotor is below the fuselage, and a forward thrust orientation, wherein the aft rotor is aft of the fuselage.

2. The tiltrotor aircraft as recited in claim 1 wherein the forward rotors are counter rotated to control yaw in the vertical takeoff and landing flight mode.

3. The tiltrotor aircraft as recited in claim 1 wherein the forward rotors are counter rotated and the aft rotor is torque offset to control yaw in the vertical takeoff and landing flight mode.

4. The tiltrotor aircraft as recited in claim 1 wherein the aft rotor is torque offset to control yaw in the vertical takeoff and landing flight mode.

5. The tiltrotor aircraft as recited in claim 1 wherein the wing further comprises at least one flaperon.

6. The tiltrotor aircraft as recited in claim 1 wherein the forward rotors further comprise folding rotor blades operable to reduce drag in the forward flight mode.

7. The tiltrotor aircraft as recited in claim 1 wherein the aft rotor further comprises fixed pitch rotor blades.

8. The tiltrotor aircraft as recited in claim 1 further comprising a flight control system operably associated with the forward rotors and the aft rotor, the flight control system operable to independently control each of the forward and aft rotors including transitions between the vertical lift and the forward thrust orientations.

9. The tiltrotor aircraft as recited in claim 8 wherein the flight control system commands operation of the forward and aft rotors responsive to at least one of onboard pilot flight control, remote flight control, autonomous flight control and combinations thereof.

10. The tiltrotor aircraft as recited in claim 1 wherein the forward rotors are common rotated and the aft rotor is counter rotated to control yaw in the vertical takeoff and landing flight mode.

11. The tiltrotor aircraft as recited in claim 10 wherein each of the forward rotors is smaller than the aft rotor.

12. The tiltrotor aircraft as recited in claim 10 wherein each of the forward rotors has a lesser pitch than the aft rotor.

13. The tiltrotor aircraft as recited in claim 1 further comprising a power system including at least one electric motor operably associated with each of the rotors and an electric energy source.

14. The tiltrotor aircraft as recited in claim 13 wherein the electric energy source further comprises at least one battery.

15. The tiltrotor aircraft as recited in claim 13 wherein the electric energy source further comprises at least one internal combustion engine and at least one electric generator.

16. The tiltrotor aircraft as recited in claim 1 further comprising first and second tail assemblies respectively coupled to the aft ends of the first and second tip booms, the first and second tail assemblies operating in an upwash in the forward flight mode.

17. The tiltrotor aircraft as recited in claim 16 wherein the first and second tail assemblies operate in a dynamic pressure ratio of between 1.0 and 1.3 in the forward flight mode.

18. The tiltrotor aircraft as recited in claim 16 wherein the tail assemblies further comprise vertical and horizontal stabilizers.

19. The tiltrotor aircraft as recited in claim 16 wherein each tail assembly further comprises a rudder and elevator.

20. A tiltrotor aircraft having a vertical takeoff and landing flight mode and a forward flight mode, the aircraft comprising:
a longitudinally extending fuselage having an aft end;
a wing extending laterally from the fuselage having first and second oppositely disposed wing tips distal from the fuselage;
first and second tip booms respectively extending longitudinally from the first and second wing tips, the first and second tip booms each having forward and aft ends;
first and second forward rotors respectively coupled to the forward ends of the first and second tip booms, the first and second forward rotors reversibly tiltable between a vertical lift orientation, wherein the first and second forward rotors are above the respective first and second tip booms, and a forward thrust orientation, wherein the first and second forward rotors are forward of the respective first and second tip booms;
first and second tail assemblies respectively coupled to the aft ends of the first and second tip booms, the first and second tail assemblies operating in an upwash in the forward flight mode;
an aft rotor coupled to the aft end of the fuselage, the aft rotor reversibly tiltable between a vertical lift orientation, wherein the aft rotor is below the fuselage, and a forward thrust orientation, wherein the aft rotor is aft of the fuselage;
a flight control system operably associated with the forward rotors and the aft rotor, the flight control system operable to independently control each of the forward and aft rotors including transitions between the vertical lift and the forward thrust orientations; and
a power system including at least one electric motor operably associated with each of the rotors and an electric energy source.

* * * * *